(12) United States Patent
Miller et al.

(10) Patent No.: US 11,448,287 B2
(45) Date of Patent: Sep. 20, 2022

(54) INTERNALLY DAMPED CROSSBAR ASSEMBLY HAVING ELASTOMERIC ISOLATOR

(71) Applicant: Raytheon Company, Waltham, MA (US)

(72) Inventors: Kirk A. Miller, Dallas, TX (US); Sean G. Thomas, McKinney, TX (US)

(73) Assignee: Raytheon Company, Waltham, MA (US)

(*) Notice: Subject to any disclaimer, the term of this patent is extended or adjusted under 35 U.S.C. 154(b) by 263 days.

(21) Appl. No.: 16/721,726

(22) Filed: Dec. 19, 2019

(65) Prior Publication Data

US 2021/0190170 A1 Jun. 24, 2021

(51) Int. Cl.
*F16F 15/08* (2006.01)
*G01C 21/18* (2006.01)

(52) U.S. Cl.
CPC .......... *F16F 15/08* (2013.01); *F16F 2222/02* (2013.01); *F16F 2224/025* (2013.01); *F16F 2230/0047* (2013.01); *G01C 21/18* (2013.01)

(58) Field of Classification Search
CPC combination set(s) only.
See application file for complete search history.

(56) References Cited

U.S. PATENT DOCUMENTS

| | | | |
|---|---|---|---|
| 1,824,085 A | 9/1931 | Karnes et al. | |
| 2,378,744 A | 6/1945 | Annen | |
| 3,385,542 A | 5/1968 | Enemark et al. | |
| 3,773,285 A | 11/1973 | Morrill | |
| 4,318,522 A * | 3/1982 | Appleberry | B64G 1/66 248/179.1 |
| 4,341,452 A | 7/1982 | Korling | |

(Continued)

FOREIGN PATENT DOCUMENTS

| | | |
|---|---|---|
| CN | 100585052 C | 1/2010 |
| EP | 2798314 A1 | 11/2014 |

(Continued)

OTHER PUBLICATIONS

International Search Report for International Application No. PCT/US2020/056155 dated Feb. 23, 2021, 32 pages.

(Continued)

*Primary Examiner* — Monica E Millner

(57) ABSTRACT

A crossbar assembly for facilitating isolation of a sensor assembly from vibration of a payload mounting system on a vehicle comprises an outer crossbar segment, an inner crossbar segment, and an isolator. The outer crossbar segment comprises a payload mount interface operable to mount to a payload mount, and an outer isolator interface operable to mount to an isolator. The inner crossbar segment comprises a structure interface to mount to a structure, and an inner isolator interface operable to mount to the isolator. The isolator can be supported by the outer and inner crossbar segments. The isolator comprises an elastomeric component operable to elastically deform in response to relative movement between the outer and inner crossbar segments. The isolator operates to partially decouple the outer crossbar segment from the inner crossbar segment and dampen vibrations propagating between the outer and inner crossbar segments.

25 Claims, 14 Drawing Sheets

(56) References Cited

U.S. PATENT DOCUMENTS

| | | |
|---|---|---|
| 4,498,038 A | 2/1985 | Malueg |
| 4,625,938 A | 12/1986 | Brown |
| 4,669,843 A | 6/1987 | Bozzolato |
| 5,184,521 A * | 2/1993 | Tyler .................. G01C 21/18 |
| | | 248/324 |
| 5,368,271 A | 11/1994 | Kiunke et al. |
| 5,897,223 A | 4/1999 | Tritchew et al. |
| 6,003,829 A | 12/1999 | Martinsson |
| 6,454,229 B1 | 9/2002 | Voigt et al. |
| 6,484,978 B2 | 11/2002 | Voigt et al. |
| 7,000,883 B2 | 2/2006 | Mercadal et al. |
| 7,324,747 B2 * | 1/2008 | Kempas .................. B64C 1/36 |
| | | 244/129.1 |
| 7,561,784 B2 | 7/2009 | Wescott et al. |
| 7,699,691 B1 | 4/2010 | Voigt et al. |
| 8,100,377 B1 | 1/2012 | Blackburn |
| 8,844,896 B2 | 9/2014 | Pettersson |
| 9,348,197 B2 | 5/2016 | Lewis |
| 9,765,925 B2 * | 9/2017 | Lewis .................. F16F 15/00 |
| 10,906,636 B2 | 2/2021 | Welsh et al. |
| 2002/0158181 A1 | 10/2002 | Carter et al. |
| 2002/0158182 A1 | 10/2002 | Carter et al. |
| 2005/0031335 A1 | 2/2005 | Itzkowitz |
| 2008/0158371 A1 | 7/2008 | Trescott |
| 2009/0148150 A1 | 6/2009 | Valles Navarro et al. |
| 2009/0216394 A1 | 8/2009 | Heppe et al. |
| 2010/0234844 A1 * | 9/2010 | Edelhauser ............ A61B 17/62 |
| | | 606/56 |
| 2014/0176717 A1 | 6/2014 | De Paschoal |
| 2016/0139494 A1 | 5/2016 | Tien et al. |
| 2017/0175948 A1 | 6/2017 | Zeise et al. |
| 2018/0004064 A1 | 1/2018 | Kim |
| 2020/0173511 A1 | 6/2020 | Miller et al. |
| 2020/0307826 A1 | 10/2020 | Zhang et al. |
| 2021/0188187 A1 * | 6/2021 | Miller .................. G03B 17/561 |
| 2021/0190171 A1 * | 6/2021 | Miller .................. G03B 15/006 |
| 2021/0190263 A1 | 6/2021 | Thomas |

FOREIGN PATENT DOCUMENTS

| | | |
|---|---|---|
| EP | 3220006 A1 | 9/2017 |
| JP | 2000-214745 A | 8/2000 |
| JP | 2002-154491 A | 5/2002 |
| JP | 5090293 B2 | 12/2012 |
| KR | 101362926 B1 | 2/2014 |
| KR | 101979293 B1 | 5/2019 |
| WO | WO 1996/02770 A1 | 2/1996 |
| WO | WO 2015/149079 A1 | 10/2015 |
| WO | WO 2017/179160 A1 | 10/2017 |

OTHER PUBLICATIONS

International Search Report for International Application No. PCT/US2020/056167 dated Feb. 12, 2021, 15 pages.
International Search Report for International Application No. PCT/US2020/056126 dated Feb. 3, 2020, 10 pages.
International Search Report for International Application No. PCT/US2020/056135 dated Feb. 11, 2020, 14 pages.
International Search Report for International Application No. PCT/US2020/056148 dated Feb. 16, 2021, 14 pages.
Leonardo DRS, Mast Muonted Sight (MMS), https://www.leonardodrs.com/media/3296/mms_datasheet.pdf, to the best of applicant's knowledge article was available before the application filing date, 2 pages, Melbourne, Florida.

* cited by examiner

INTERNALLY DAMPED CROSSBAR ASSEMBLY HAVING ELASTOMERIC ISOLATOR

BACKGROUND

Sensors, such as imaging sensors, can be mounted to mobile vehicles, such as aircraft, land vehicles, and watercraft using a payload system mount rotatably coupled to the vehicle. The payload system mount with its rotatable coupling can include at least two rotating joints. For example, a first rotating joint can allow azimuth rotation of the payload system mount while a second rotating joint coupled to the first rotating joint can allow elevational rotation of the payload system mount. A crossbar system can be coupled to the payload system mount and can support a sensor assembly (e.g., an imaging assembly or system) in isolation. The sensor assembly can be mounted at a central location of the crossbar system and a first and second end of the crossbar system can be coupled to the payload system mount. Thus, the first rotating joint can be configured to facilitate azimuth rotation of the sensor assembly, and the second rotating joint can be configured to facilitate elevational rotation of the sensor assembly.

The crossbar system is configured to transmit motion of the payload system mount to the sensor assembly. However, it is not desirable to transmit all motion to the sensor assembly. For example, sensors can be sensitive to vibration and sudden acceleration (e.g., due to shock or other loads) and can experience a loss of resolution when subjected to these. For example, vehicles experience accelerations and vibrations during operation that can be detrimental to the functioning of the sensor. These accelerations and vibrations, if not isolated and damped, can be transmitted from the vehicle through the payload mount system to the sensor assembly and the sensor payload.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
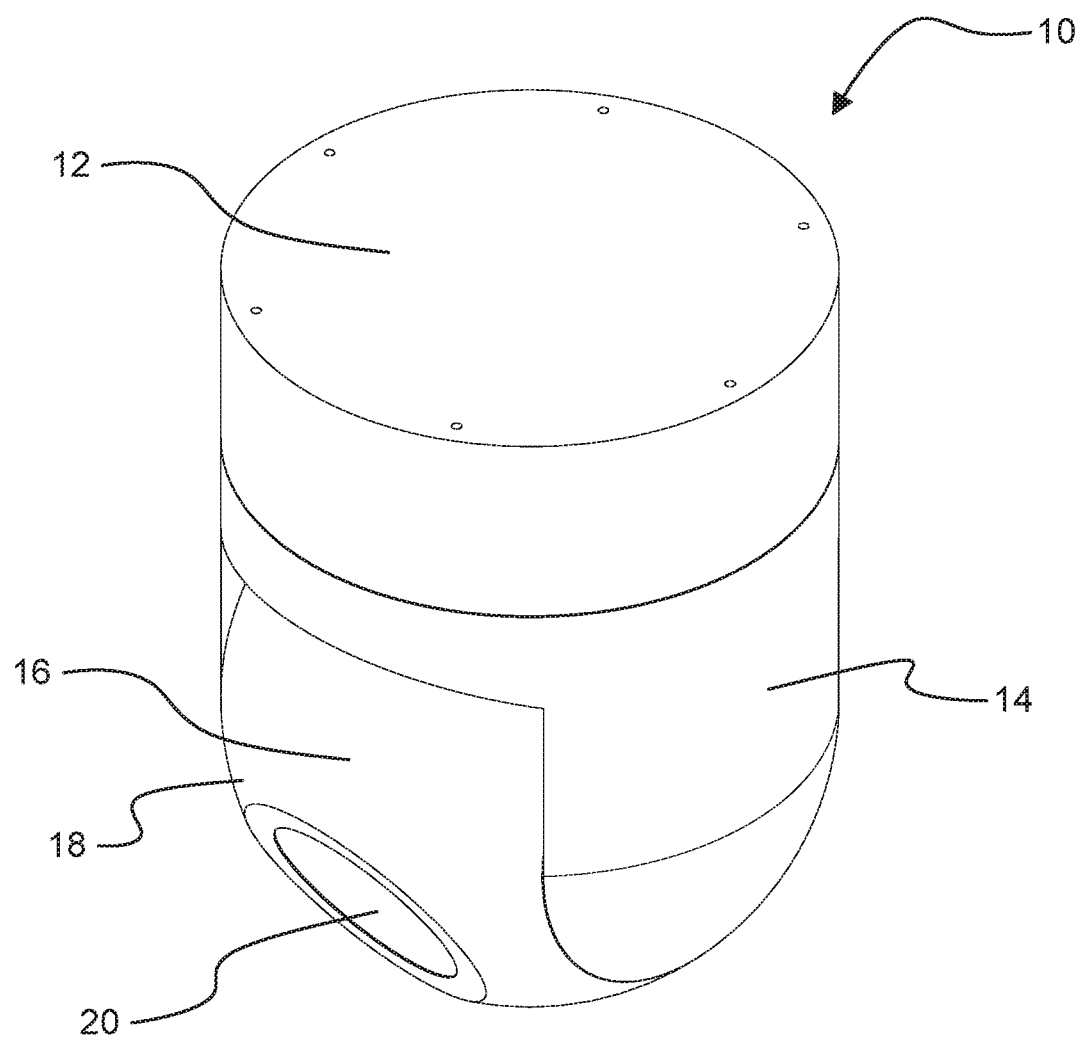
FIG. 1 illustrates an isometric view of a payload mounting system in accordance with an example of the present disclosure.

Reference will now be made to the examples illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

In one example, disclosed is a crossbar system for facilitating isolation of a sensor assembly from external vibration of a structure. The crossbar system comprises a first crossbar assembly, a second crossbar assembly, and a payload mount. The first crossbar assembly comprises a first structure interface operable to mount to a structure, a first payload mount interface operable to couple to a payload mount, and a first isolator between the first structure interface and the first payload mount interface. The first isolator comprises a first elastomeric body operable to partially decouple the first structure interface and the first payload mount interface and dampen vibrations propagating through the first crossbar assembly. The second crossbar assembly comprises a second structure interface operable to mount to the structure, a second payload mount interface operable to couple to the payload mount, and a second isolator between the second structure interface and the second payload mount interface. The second isolator comprises a second elastomeric body operable to partially decouple the first structure interface and the second payload mount interface and dampen vibrations propagating through the second crossbar assembly. The payload mount is coupled to the first payload mount interface and the second payload mount interface and is operable to mount a sensor assembly.

In accordance with a more detailed aspect, the first crossbar assembly can further comprise a first outer crossbar segment coupled to the first structure interface and the first isolator, and a first inner crossbar segment coupled to the first payload mount interface and the first isolator, and the second crossbar assembly can further comprise a second outer crossbar segment coupled to the second structure interface and the second isolator, and a second inner crossbar segment coupled to the second payload mount interface and the second isolator.

In accordance with a more detailed aspect, the first isolator can comprise a first heater thermally coupled to the first elastomeric body, and the second isolator can comprise a second heater thermally coupled to the second elastomeric body.

In accordance with a more detailed aspect, the first isolator can further comprise a flange having an aperture sized and configured to receive the first elastomeric body, a sleeve secured within the first elastomeric body, and a fastener coupling the sleeve to the first inner crossbar segment.

In accordance with a more detailed aspect, the crossbar system can further comprise a heater located within the fastener.

In accordance with a more detailed aspect, the first inner crossbar segment can comprise a socket and the first outer crossbar segment can comprise a shaft. The first elastomeric body can be located at least partially about the shaft and at least partially within the socket.

In accordance with a more detailed aspect, the shaft can be located at least partially within the socket.

In accordance with a more detailed aspect, the crossbar system can further comprise at least one fastener extending from the first outer crossbar segment to the first inner crossbar segment. The at least one fastener can couple the first outer crossbar segment to the first inner crossbar segment.

Also disclosed is a crossbar assembly for facilitating isolation of a sensor assembly from external vibration of a payload system mount on a vehicle. The crossbar assembly comprises an outer crossbar segment, an inner crossbar segment, and an isolator. The outer crossbar segment comprises a payload mount interface operable to mount to a payload mount, and an outer isolator interface operable to mount to an isolator. The inner crossbar segment can be moveable relative to the outer crossbar segment in multiple degrees of freedom. The inner crossbar segment comprises a structure interface operable to mount to a structure, and an inner isolator interface operable to mount to the isolator. The isolator can be supported by the outer and inner crossbar segments. The isolator comprises an elastomeric component operable to elastically deform in response to relative movement between the outer and inner crossbar segments. The isolator operates to partially decouple the outer crossbar segment from the inner crossbar segment and dampen vibrations propagating between the outer and inner crossbar segments.

In accordance with a more detailed aspect, the isolator can comprise a flange coupled to an outer surface of the elastomeric component and a sleeve coupled to an inner surface of the elastomeric component.

In accordance with a more detailed aspect, the flange can be coupled to the outer isolator interface and the sleeve can be coupled to the inner isolator interface.

In accordance with a more detailed aspect, the crossbar assembly can further comprise a bolt coupling the sleeve to the inner isolator interface and a heater located within the bolt.

In accordance with a more detailed aspect, the inner isolator interface can comprise a socket and the outer isolator interface can comprise a shaft. The elastomeric component can be located at least partially about the shaft and at least partially within the socket.

In accordance with a more detailed aspect, the shaft can be located at least partially within the socket.

In accordance with a more detailed aspect, the crossbar assembly can further comprise at least one fastener extending from the outer isolator interface to the inner isolator interface and coupling the inner isolator interface to the outer isolator interface.

Also disclosed is a payload system mount comprising a base structure, a support structure rotatably coupled to the base structure, a crossbar system, and a sensor assembly. The crossbar system comprises a first crossbar assembly, a second crossbar assembly, and a payload mount. The first crossbar assembly comprises a first structure interface coupled to the support structure, a first payload mount interface operable to couple to a payload mount, and a first isolator between the first structure interface and the first payload mount interface. The first isolator comprises a first elastomeric body operable to partially decouple the first structure interface and the first payload mount interface and dampen vibrations propagating through the first crossbar. The second crossbar assembly comprises a second structure interface coupled to the support structure, a second payload mount interface operable to couple to the payload mount, and a second isolator between the second structure interface and the second payload mount interface. The second isolator comprises a second elastomeric body operable to partially decouple the first structure interface and the first payload mount interface and dampen vibrations propagating through the second crossbar. The payload mount is coupled to the first payload mount interface and the second payload mount interface. The sensor assembly is coupled to the payload mount and comprises at least one sensor.

In accordance with a more detailed aspect, the first crossbar assembly can further comprise a first outer crossbar segment coupled to the first rotating joint and the first isolator, and a first inner crossbar segment coupled to the first payload mount interface and the first isolator region. The second crossbar assembly can further comprise a second outer crossbar segment coupled to the second rotating joint and the second isolator, and a second inner crossbar segment coupled to the second payload mount interface and the second isolator region.

In accordance with a more detailed aspect, the first isolator can comprise a first heater thermally coupled to the first elastomeric body, and the second isolator can comprise a second heater thermally coupled to the second elastomeric body.

In accordance with a more detailed aspect, the first isolator can further comprise a flange having an inner aperture sized and configured to receive the first elastomeric body, a sleeve secured within the first elastomeric body, and a fastener coupling the sleeve to the first inner crossbar segment.

In accordance with a more detailed aspect, the first inner crossbar segment can comprise a socket and the first outer crossbar segment can comprise a shaft. The first elastomeric body can be located at least partially about the shaft and at least partially within the socket.

Figure 2:
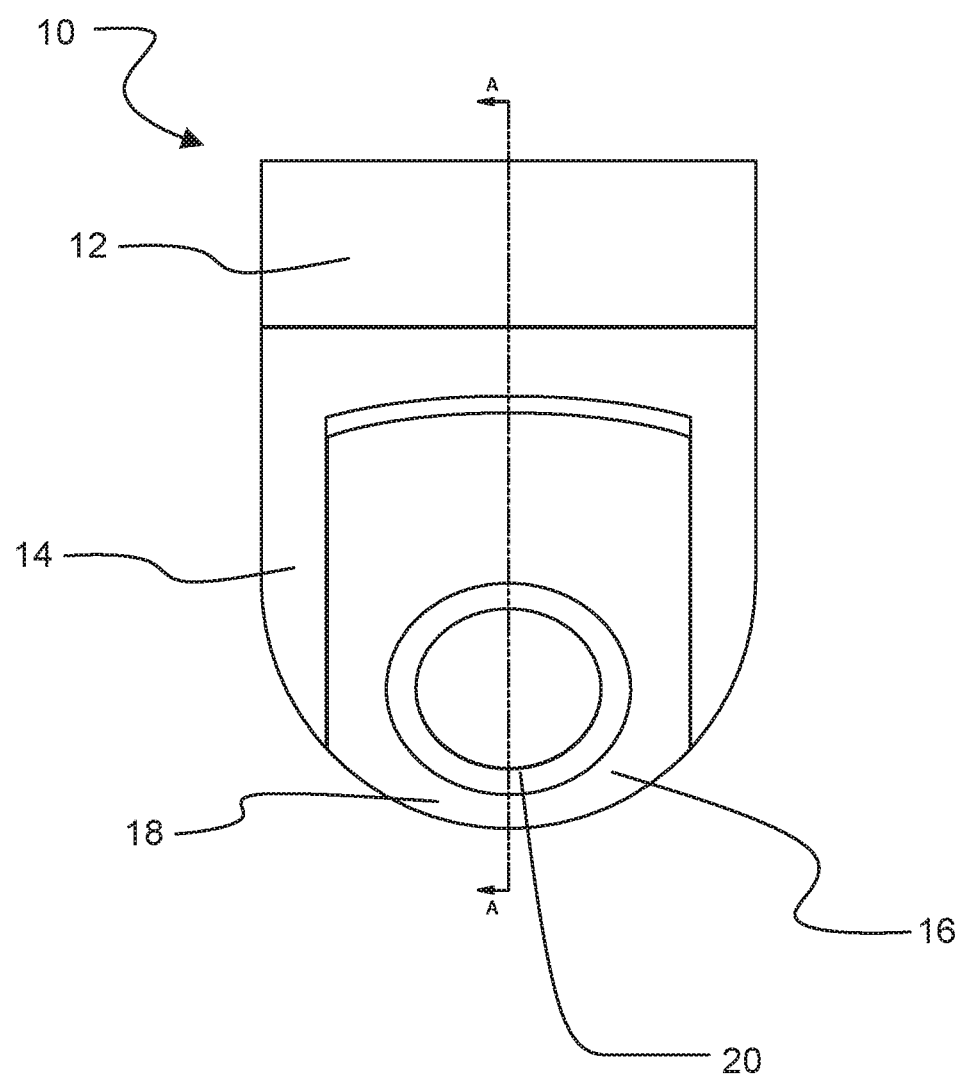
FIG. 2 illustrates a front view of the payload mounting system of FIG. 1.

To further describe the present technology, examples are now provided with reference to the figures. FIG. 1 illustrates an isometric view of a payload system mount 10 in accordance with an example of the present disclosure and FIG. 2 illustrates a front view of the payload system mount 10 of FIG. 1. With reference to FIGS. 1 and 2, the exemplary payload system mount 10 can comprise a turret mounted to a vehicle, and that is operable to support a payload, such as a sensor assembly having a sensor (e.g., an imaging sensor (e.g., a camera)), wherein the payload is supported by a crossbar system (discussed below). The turret can comprise a base 12 which can be coupled to the vehicle. A coarse azimuth platform 14 can be rotatably coupled to the base 12, and a coarse elevation platform 16 can be rotatably coupled to the coarse azimuth platform 14. The coarse elevation platform 16 can include a shell 18, which can house the payload in the form of the sensor assembly, including the sensor, and a crossbar system suspending and isolating the sensor assembly payload. A window 20 can be positioned at an outer surface of the shell 18 and provides transparent access to the sensor assembly, as well as facilitates a field of view of the sensor assembly through the payload system mount 10. For example, the sensor assembly can include a visual sensor, and the window 20 can be configured to be transparent to visible light. In another example, the sensor assembly can include a thermal radiation sensor, and the window 20 can be configured to be transparent to infrared radiation. In addition, the visual sensor, as mounted within the payload system mount 10, can be configured to sense or image objects through the window 20 that are within its field of view.

The payload system mount 10, and particularly the base 12, can be mounted or coupled to the vehicle using conventional techniques, such as bolted fasteners, weldments, or any other means as will be appreciated by those skilled in the art. Although the payload system mount 10 of FIGS. 1 and 2 is shown extending downward, in other examples the payload system mount 10 can be mounted so as to extend laterally or upward. The coarse azimuth platform 14 can be rotatably coupled to the base 12. For example, the coarse azimuth platform 14 can have a turntable type mount (not shown) rotatably coupling the coarse azimuth platform 14 to the base 12. In the example of FIGS. 1 and 2, the turntable mount can effectuate relative movement between the coarse azimuth platform 14 and the base 12 about a substantially vertical axis providing azimuthal rotation. The coarse azimuth platform 14 can be actuated using common actuators, such as electric actuators, hydraulic actuators, and others as will be appreciated and apparent to those skilled in the art.

The coarse elevation platform 16 can be rotatably coupled to the coarse azimuth platform 14. The coarse elevation platform 16 can be coupled or mounted to the coarse azimuth platform 14 by a rotating joint to effectuate movement between the coarse elevation platform 16 and the coarse azimuth platform 14. In the example of FIG. 1, the coarse elevation platform 16 can rotate relative to the coarse azimuth platform 14 about an axis that is substantially perpendicular to the axis of rotation of the coarse azimuth platform 14 relative to the base 12. For example, when the coarse azimuth platform 14 rotates about a vertical axis (from the perspective shown in FIGS. 1 and 2), the coarse elevation platform 16 can rotate about a horizontal axis.

Although FIGS. 1 and 2 illustrate the payload system mount 10 as comprising a turret type of payload system mount, this is not intended to be limiting in any way. Indeed, those skilled in the art will recognize other types of payload system mounts in which the crossbar system described herein can be used and supported for isolating a payload supported by the crossbar system. For example, an alternative configuration would be embedded behind a conformal window on the outside of a platform. Angular travel would be limited to the extents of travel of the spherical joint between the payload interface and the crossbar system. Need for vibration isolation would be the reason for having the interface between the sensor and the vehicle. Another alternative would be a pod configuration, which is essentially a turret mounted with the azimuth axis horizontal and identified as the "roll" axis.

Figure 3:
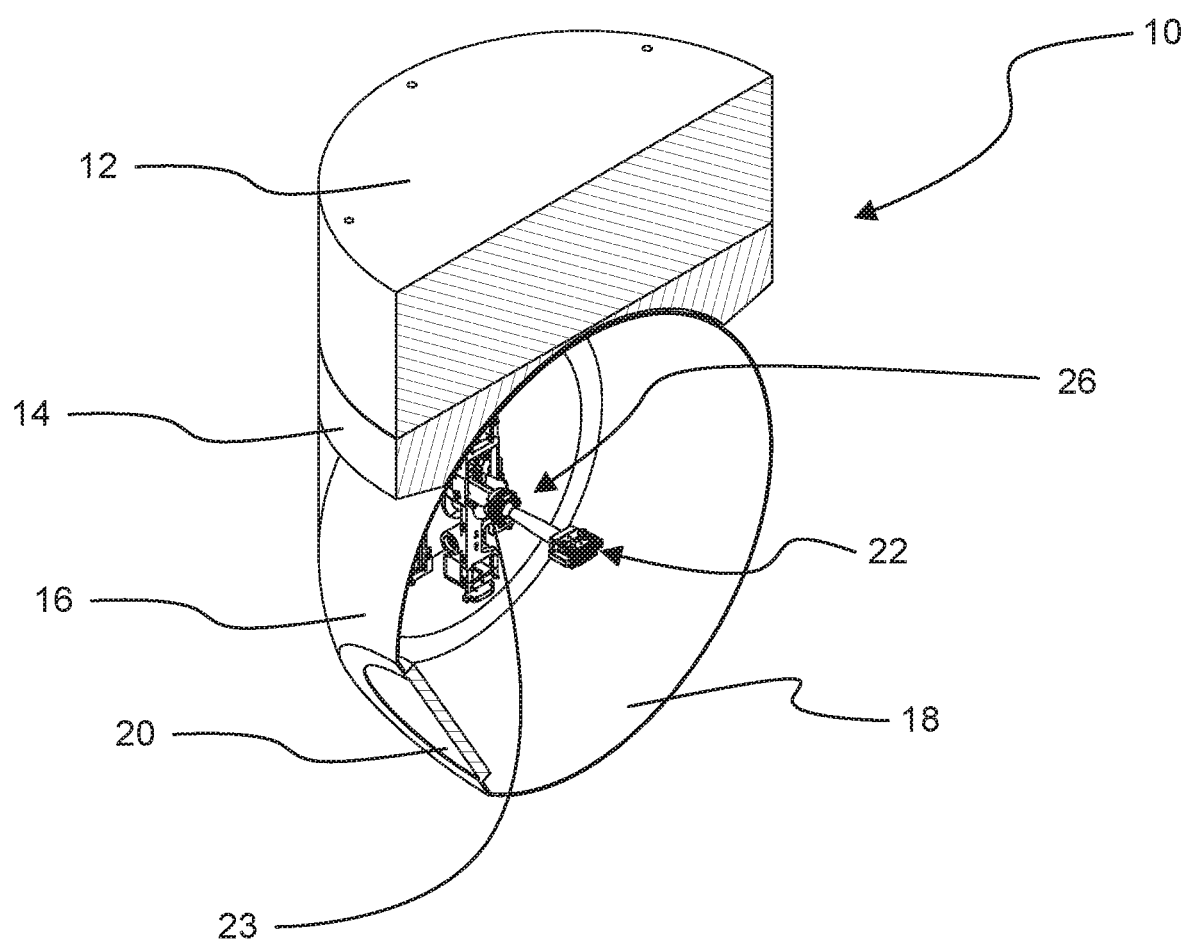
FIG. 3 illustrates an isometric, cross-sectional view of the payload mounting system of FIG. 1, taken along line AA of FIG. 2.

FIG. 3 illustrates a cross section of the payload system mount 10 of FIGS. 1 and 2, taken along line AA of FIG. 2. As shown, the payload system mount 10 can comprise a base structure, such as coarse azimuth platform 14, a support structure such as coarse elevation platform, and a crossbar system 26 in support of a payload mount 22. The crossbar system 26 can be coupled to the support structure of the payload system mount 10 such that rotation of the support structure relative to the base structure results in rotation of the crossbar system 26 and in turn a sensor assembly (and sensor) coupled to the payload mount 22. In some examples, the crossbar system 26 can be coupled to the coarse elevation platform 16 using conventional fastening techniques, such as threaded fasteners, adhesives, weldments, and others. The crossbar system 26 can span a width of the coarse elevation platform 16, such that the crossbar system 26 is suspended only at the distal ends 23 of the crossbar system 26.

Figure 4:
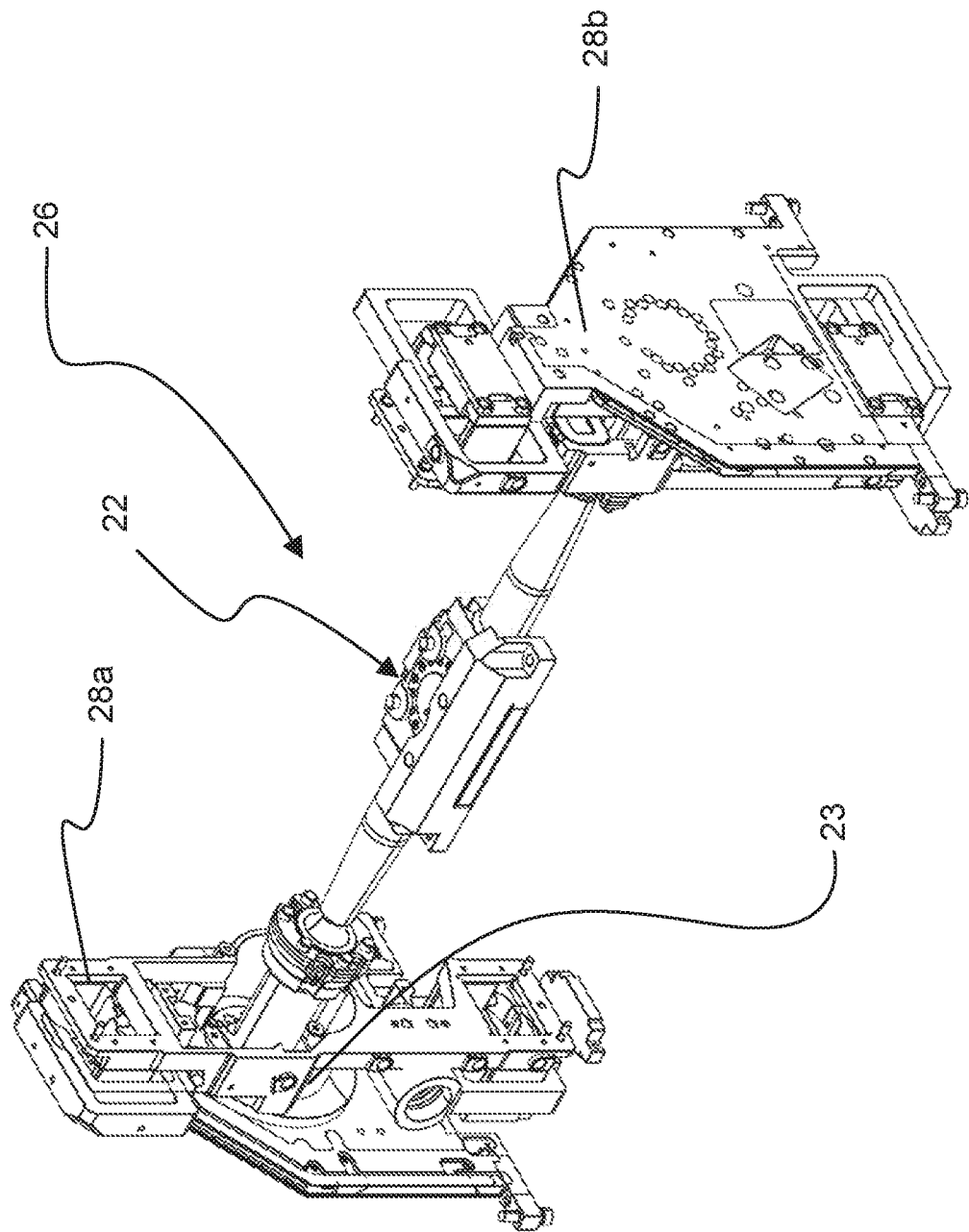
FIG. 4 illustrates an isometric view of the crossbar system and a support structure of the payload mounting system of FIG. 1.
Figure 5:
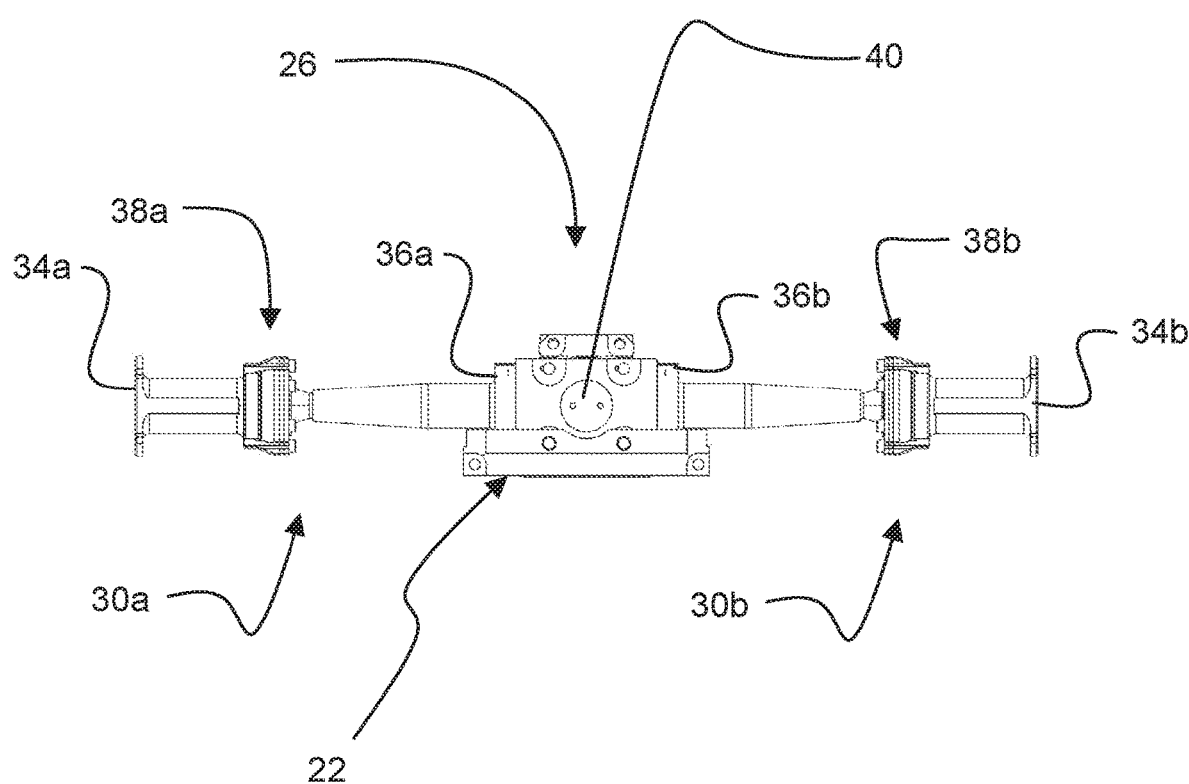
FIG. 5 illustrates a top view of the crossbar system shown in FIGS. 1 and 4 with the support structure not shown.

FIG. 4 illustrates the crossbar system 26 and first and second portions 28a, 28b of the support structure. The first and second portions 28a, 28b can be a component of the coarse elevation platform 16 of FIG. 3. In some examples, the support structure, including first and second portions 28a, 28b, can rotate with the coarse elevation platform 16. Thus, rotation of the coarse elevation platform 16 can cause the crossbar system 26 to rotate. Additionally, vibrations of a vehicle may be transmitted to the support structure. For example, referring to FIG. 1, vehicle vibrations can be transmitted from a vehicle to the base 12, from the base 12 to the coarse azimuth platform 14, from the coarse azimuth platform 14 to the coarse elevation platform 16, and from coarse elevation platform 16 to the crossbar system 26. Thus, the crossbar system 26 can experience vibrations at each distal end 23 where the crossbar system 26 mounts to the first and second portions 28a, 28b of the support structure. As will be described in greater detail below, the crossbar system 26 facilitates isolation of the sensor assembly mounted to the payload mount 22 from external vibrations propagating from the support structure and through the crossbar system, such that the external vibrations are damped, thus having little or no effect on the payload mount 22 and the payload mounted thereto, FIG. 5 illustrates the crossbar system 26 of FIG. 4 separated from the first and second portions 28a, 28b of the support structure. In the example shown, the crossbar system 26 comprises a first crossbar assembly 30a, a second crossbar assembly 30b, and a payload mount 22. The first crossbar assembly 30a comprises a first structure interface 34a at a distal end, a first payload mount interface 36a at a proximal end, and a first isolator 38a supported between the first structure interface 34a and the first payload mount interface 36a, The second crossbar assembly 30b comprises a second structure interface 34b, a second payload mount interface 36b, and a second isolator 38b supported between the second structure interface 34b and the second payload mount interface 36b.

The payload mount 22 can be coupled to the first payload mount interface 36a of the first crossbar assembly 30a, and to the second payload mount interface 36b of the second crossbar assembly 30b. The payload mount 22 can comprise a spherical joint (e.g., see spherical joint 40) or other joint operable to mount or otherwise support a sensor assembly. In one example, the payload mount 22 can comprise a cardan joint, such as the cardan joint described in U.S. patent application Ser. No. 16/721,662, filed Dec. 19, 2019, which is incorporated by reference herein in its entirety, wherein the cardan joint can comprise a suspension interface yoke that physically couples to the first and second payload mount interfaces 36a, 36b of the first and second crossbar assemblies 30a, 30b, respectively, and wherein the suspension interface yoke supports an inner assembly (e.g., a flexure, a payload interface assembly as part of a 3-axis gimbal, or others) that supports the sensor assembly (including the sensor). The payload mount 22 can enable the sensor assembly to adjust the positioning of a sensor relative to the coarse elevation platform 16. Thus, the coarse azimuth platform 14 and the coarse elevation platform 16 can provide coarse movement to the payload mount 22, which can enable the sensor assembly to make fine movements.

In some examples, the first crossbar assembly 30a and the second crossbar assembly 30b can be matching pairs having the same configuration, and that operate together to support, in a suspended state, the payload mount 22 (and the sensor assembly supported on the payload mount 22). For ease of discussion, the first crossbar assembly 30a of the crossbar system 26 will be described further with the understanding that the second crossbar assembly 30b can have the same configuration.

Figure 6:
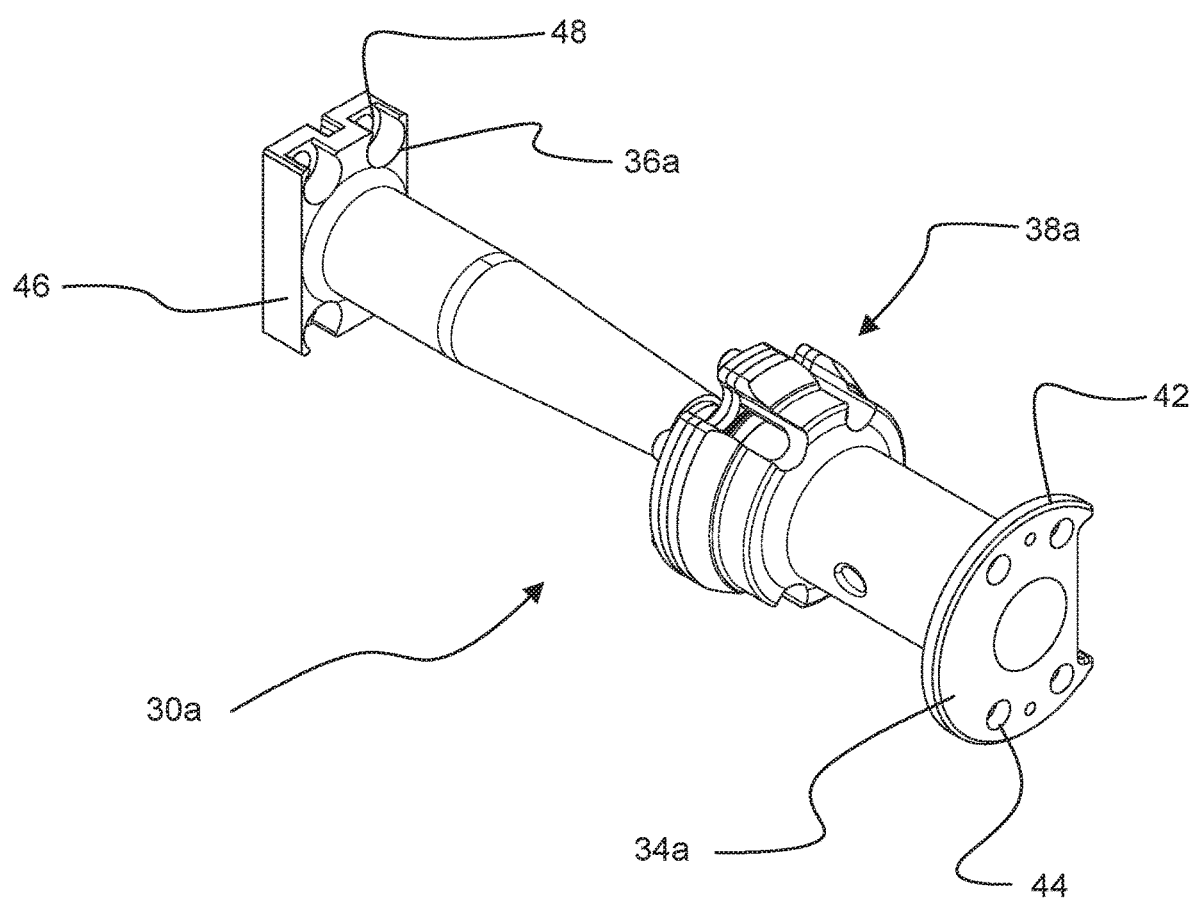
FIG. 6 illustrates an isometric view of a crossbar assembly of the crossbar system shown in FIGS. 1 and 4.

FIG. 6 illustrates the crossbar assembly 30a removed from the support structure and the payload mount 22. The structure interface 34a is operable to mount to the support structure, such as first portion 28a of FIG. 4. The structure interface 34a can comprise a flange 42 having features, such as holes 44 or threaded holes, that align with corresponding features of the support structure. The features of the flange 42 and the support structure can then be used to secure the crossbar assembly 30a to the support structure. For example, the structure interface 34a can be secured to the support structure by threading a bolt (not depicted) through a hole 44 of the flange 42 and into a threaded aperture or socket of the support structure. The sensor mount interface 36a is operable to couple to a payload mount, such as the payload mount 22 of FIG. 5. The sensor mount interface 36a can comprise a flange 46 extending from and supported by an end of an inner crossbar segment 66. The flange can comprise features, such as holes 48 or threaded holes, that align with corresponding features of the payload mount 22. The features of the flange 46 can then be used to secure the crossbar assembly 30a to the payload mount. For example, the payload mount 22 can be secured to the sensor mount interface 36a by threading a bolt (not depicted) through a hole 48 of the flange 46 and into a threaded aperture or socket of the payload mount 22. The flange 46 can be integrally formed with the inner crossbar segment 66, or the flange 46 can comprise a separate component coupled to the inner crossbar segment 66.

Figure 7:
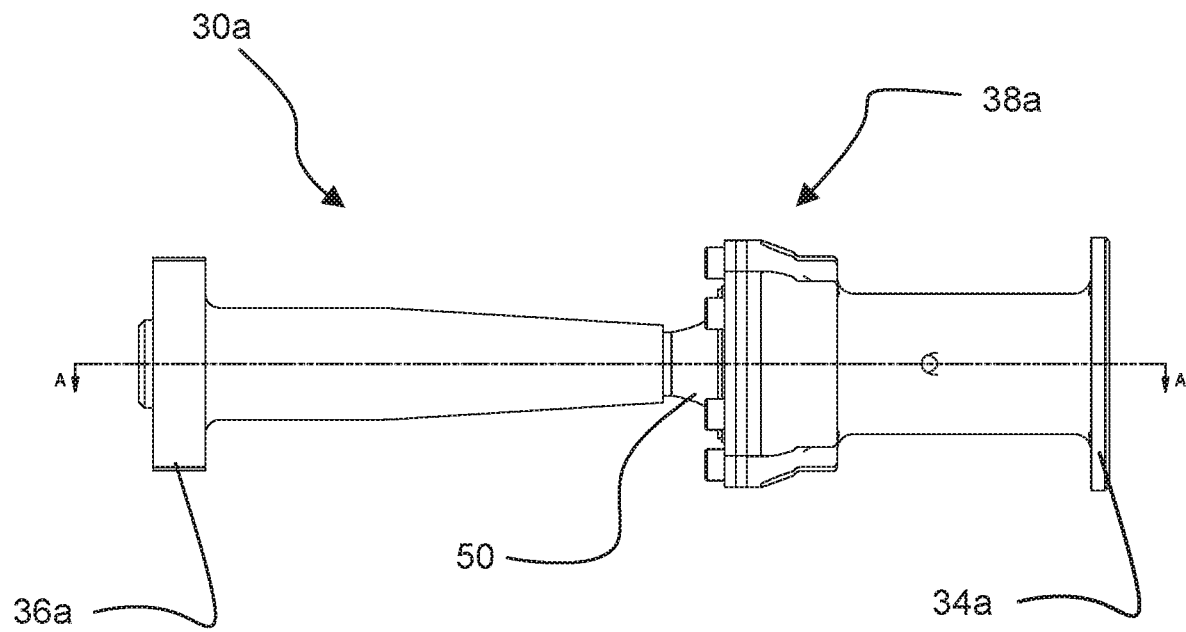
FIG. 7 illustrates a front view of the crossbar assembly shown in FIG. 6.
Figure 8:
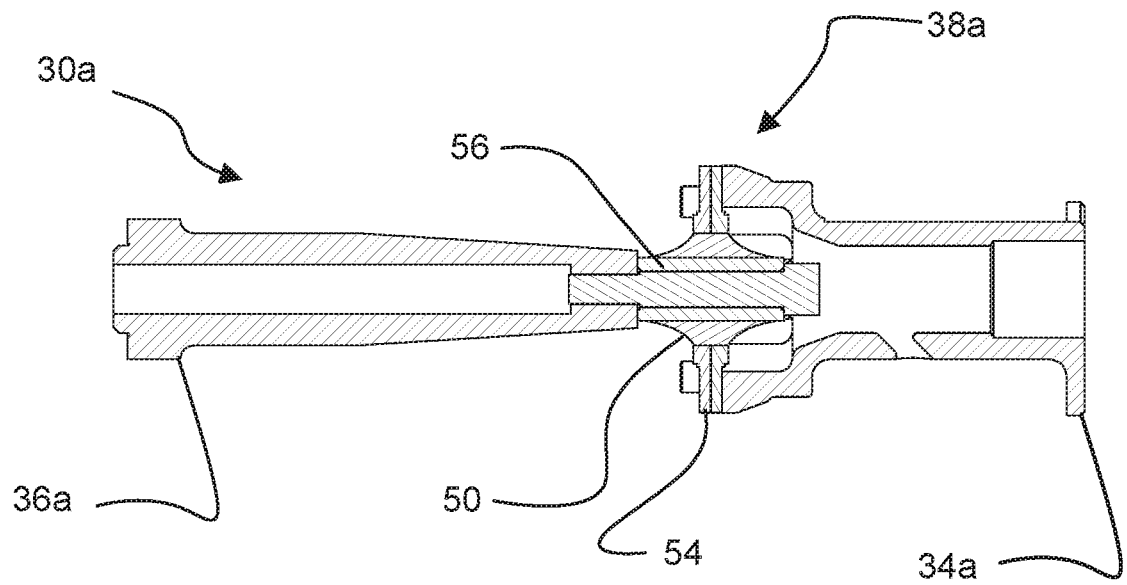
FIG. 8 illustrates a cross-sectional view of the crossbar assembly shown in FIG. 6 taken about line AA of FIG. 7.
Figure 9:
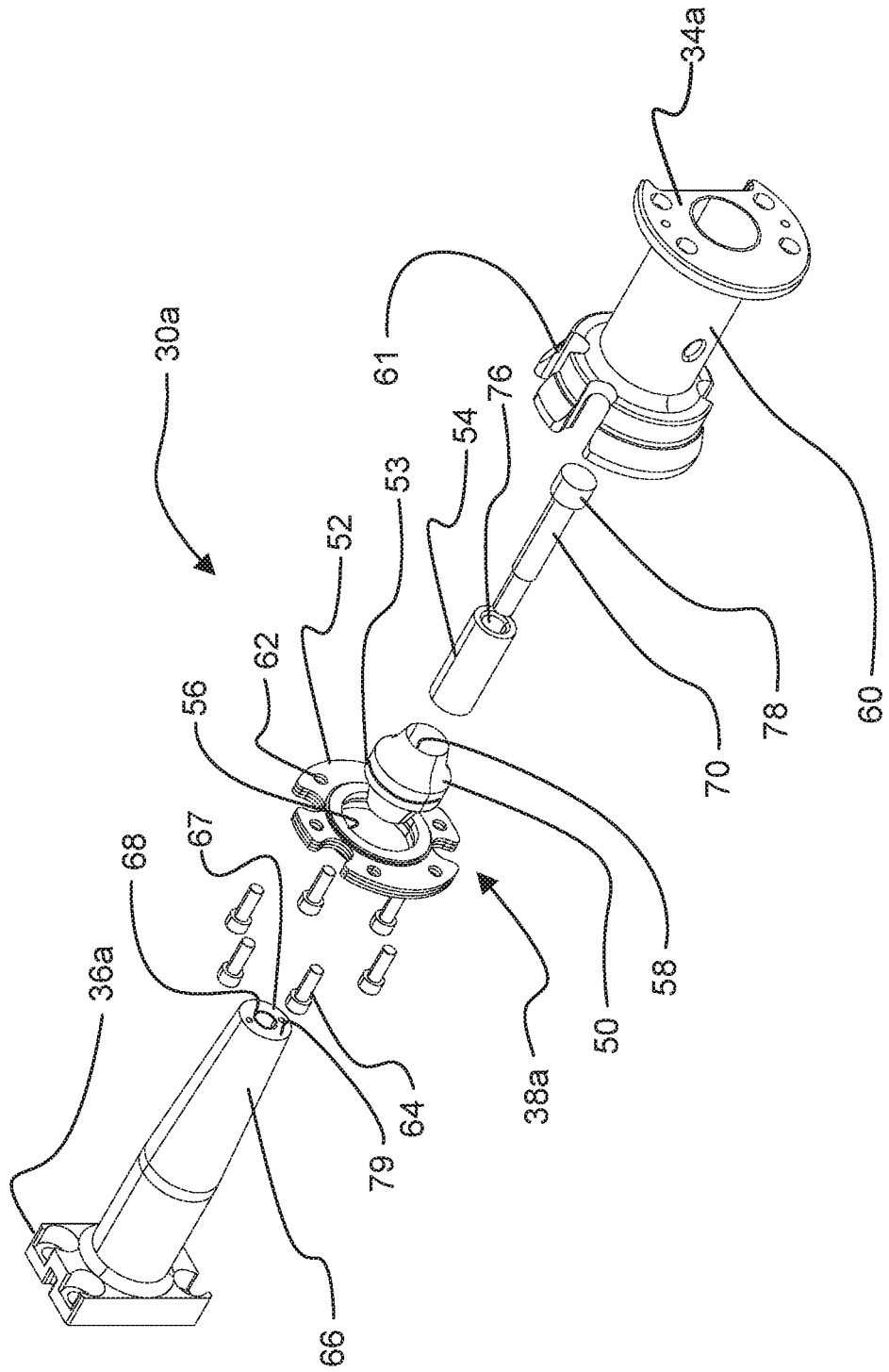
FIG. 9 illustrates an exploded view of the crossbar assembly shown in FIG. 6.

FIG. 7 illustrates the crossbar assembly 30a, and FIG. 8 illustrates a cross section of the crossbar assembly 30a, taken about line AA of FIG. 7. FIG. 9 illustrates an exploded view of the crossbar assembly 30a. With reference to FIGS. 7-9, and continued reference to FIGS. 1-6, the isolator 38a comprises an elastomeric body 50. The elastomeric body 50 partially decouples the structure interface 34a from the payload mount interface 36a and dampens vibrations propagating through the crossbar assembly 30a between the structure interface 34a and the payload mount interface 36a. Due to its viscoelastic properties, the elastomeric body 50 can have a lower stiffness that the remaining components of the crossbar assembly 30a. The lower stiffness of the elastomeric body 50 results in the crossbar assembly 30a having a lower resonant frequency compared to a uniform crossbar of a higher stiffness material. The lower resonant frequency can result in a reduction or damping of vibrations transmitted through the crossbar assembly 30a when the vibrations have a frequency higher than the resonant frequency.

The isolator 38a can further comprise a flange 52 and a sleeve 54. The flange 52 can have an aperture 56 sized and shaped to receive at least a portion of the elastomeric body 50. For example, the elastomeric body 50 can have an outer diameter equal in size to an inner diameter of the aperture 56. Or in another example, the elastomeric body 50 can have an outer diameter slightly greater than the inner diameter of the aperture 56. In some examples, the elastomeric body 50 can have a circumferential groove 53 formed on an outer surface. The aperture 56 of the flange 52 can be defined by inner wall portions of the flange 52 configured so as to be able to be received within in the circumferential groove 53, thus securing the elastomeric body 50 to the flange 52.

The elastomeric body 50 can have an aperture 58 sized and shaped to receive the sleeve 54. The sleeve 54 can have an outer diameter equal to or slightly larger than a diameter of the aperture 58 of the elastomeric body 50. In some examples, the sleeve 54 can be pressed into the aperture 58 of the elastomeric body 50 to secure the sleeve 54 within the elastomeric body 50. Friction between the elastomeric body 50 and the sleeve 54 can further secure the sleeve 54 within the elastomeric body 50. In other examples, the elastomeric body 50 can be molded and cured in contact with the sleeve 54 to secure the sleeve within the elastomeric body. In still other examples, an adhesive can be applied to an outer surface of the sleeve 54 to secure the sleeve 54 within the elastomeric body 50.

The structure interface 34a can be part of an outer crossbar segment 60, which can be coupled to the isolator 38a. The outer crossbar segment 60 can further comprise an outer isolator interface 61 operable to interface with at least a portion of the isolator 38a. In the example shown, the outer isolator interface 61 and the flange 52 can have corresponding features that allow them to be secured to one another. Specifically, the flange 52 can comprise a plurality of holes 62 and the outer isolator interface 61 can comprise a corresponding plurality of threaded sockets for receiving a plurality of bolts 64 configured to be inserted through the plurality of holes 62 and into the threaded sockets to couple the crossbar segment 60 to the isolator 38a. Each of the bolts 64 pass through a hole 62 and into a corresponding threaded socket to secure the flange 52 to the outer isolator interface 61, and the crossbar segment 60 to the isolator 38a.

The inner crossbar segment 66 can comprise an inner isolator interface 67, wherein the payload mount interface 36a can be coupled to the isolator 38a by way of the inner isolator interface 67 of the inner crossbar segment 66. The inner isolator interface 67 can have a threaded socket 68 sized and shaped to receive a threaded end of a bolt 70. The bolt 70 can be configured to pass through an aperture 76 of the sleeve 54, with the threaded end of the bolt 70 threading into the threaded socket 68 of the inner isolator interface 67 of the inner crossbar segment 66. The sleeve 54 can be retained between a head 78 of the bolt 70 and a face 79 of the inner isolator interface 67 of the inner crossbar segment 66.

Because the flange 52 and the sleeve 54 are each secured to the elastomeric body 50, securing the flange 52 to the outer isolator interface 61 and the sleeve 54 to the inner isolator interface 67 joins the inner crossbar segment 66 to the outer crossbar segment 60 in a manner, such that the inner crossbar segment 66 and the outer crossbar segment 60 are moveable relative to one another in multiple degrees of freedom, or along/about multiple axes.

The multiple degrees of freedom of relative movement can comprise three rotational degrees of freedom and three translational degrees of freedom. Indeed, the elastomeric body 50, by virtue of its lower stiffness, is operable to deform in response to certain loads to which it is tuned, thus allowing relative movement in multiple degrees of freedom between the outer crossbar segment 60 and the inner crossbar segment 66. The deformation of the elastomeric body 50 results in partially decoupling the outer crossbar segment 60 from the inner crossbar segment 66, which functions to dampen vibrations propagating between the outer crossbar segment 60 and the inner crossbar segment 66.

The resonant frequency of the crossbar assembly 30*a* can be tuned for a particular application. Tuning can involve varying any one more parameters of the elastomeric body 50, such as its size, shape or configuration, material makeup. For example, selecting an elastomeric body 50 to comprise a size, shape or material makeup that provides a lower stiffness can result in a lower resonant frequency than selecting an elastomeric body to comprise a size, shape or material makeup that provides a greater stiffness and higher resonant frequency. Additionally, the material properties of the elastomeric body 50 can be selected and varied, which can affect the amount of dampening provided by the crossbar assembly 30*a*. For example, a rubber material has a larger loss tangent than a hard material such as a metal. The elastomeric body 50 can be comprised of one or more types of elastomers. Example types of elastomers include, but are not limited to, natural rubber, neoprene rubber, nitrile rubber, silicone rubber, and urethane rubber. Each of these elastomers can be further modified with different filler to affect the modulus and damping characteristics of the elastomeric body 50.

Figure 10:
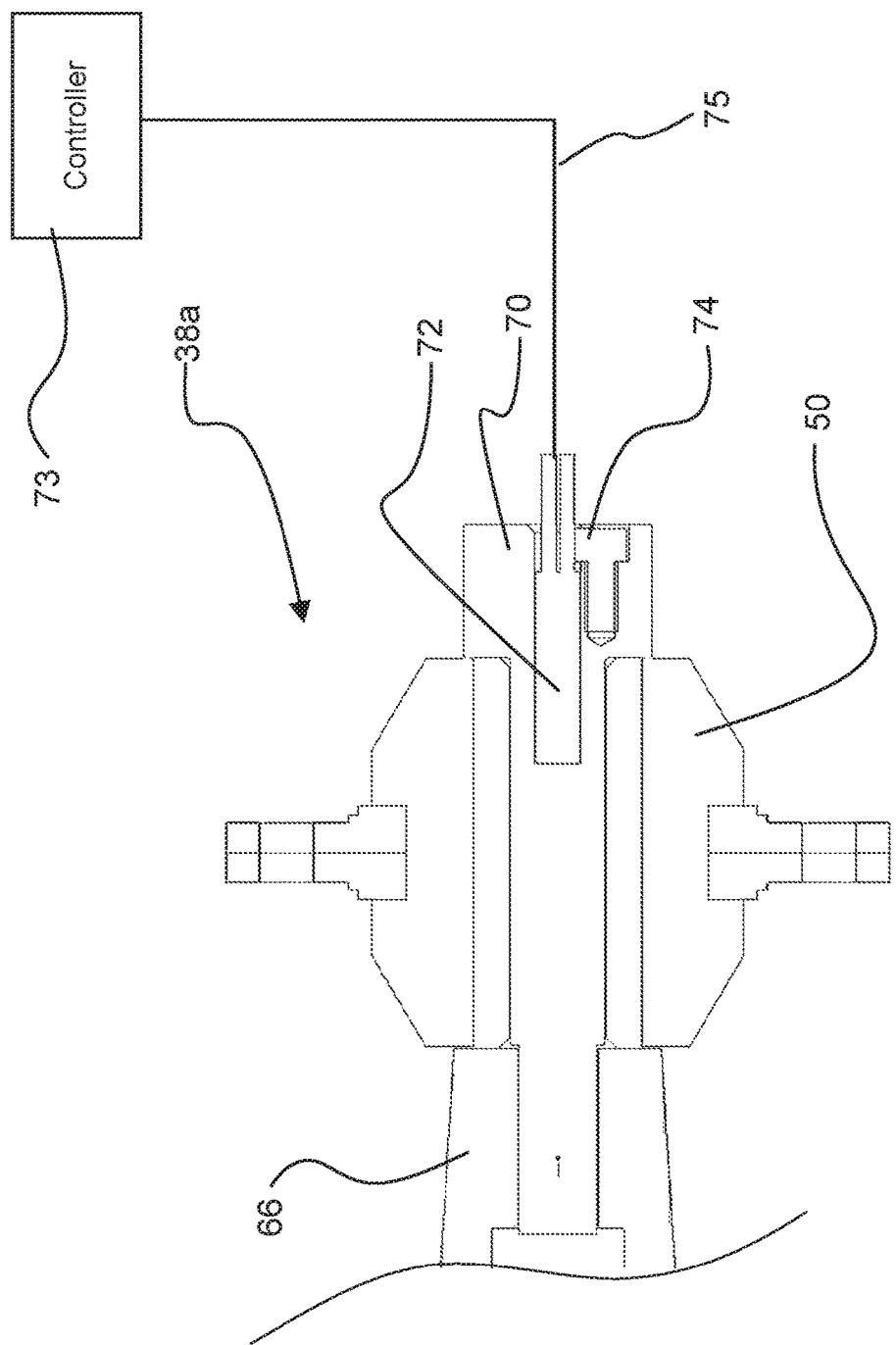
FIG. 10 illustrates a partial, cross-sectional view of an isolator of the crossbar assembly shown in FIG. 6, showing a heating element for heating an elastomeric body in accordance with an example of the present disclosure.
Figure 11:
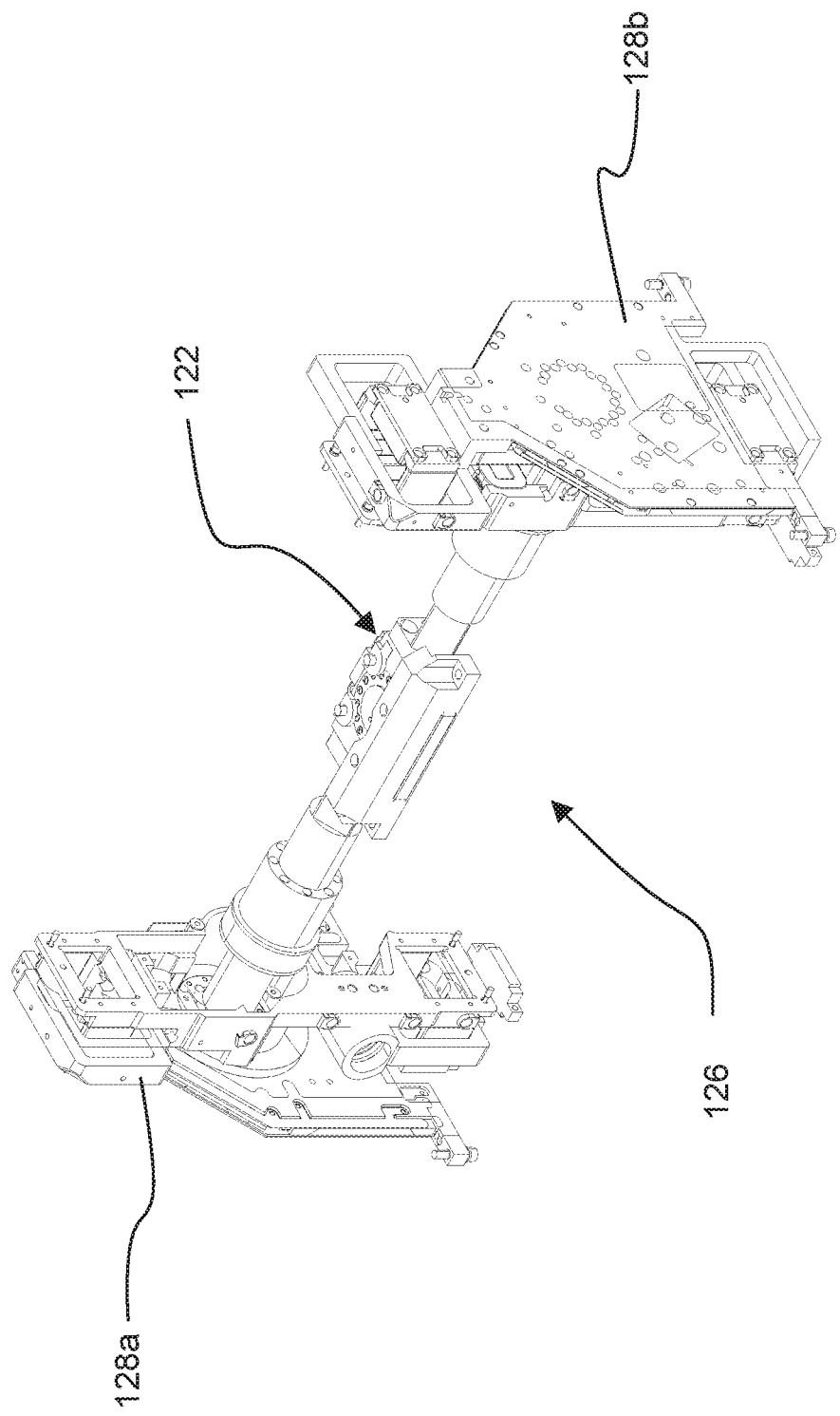
FIG. 11 illustrates an isometric view of a crossbar system and a support structure in accordance with an example of the present disclosure.
Figure 12:
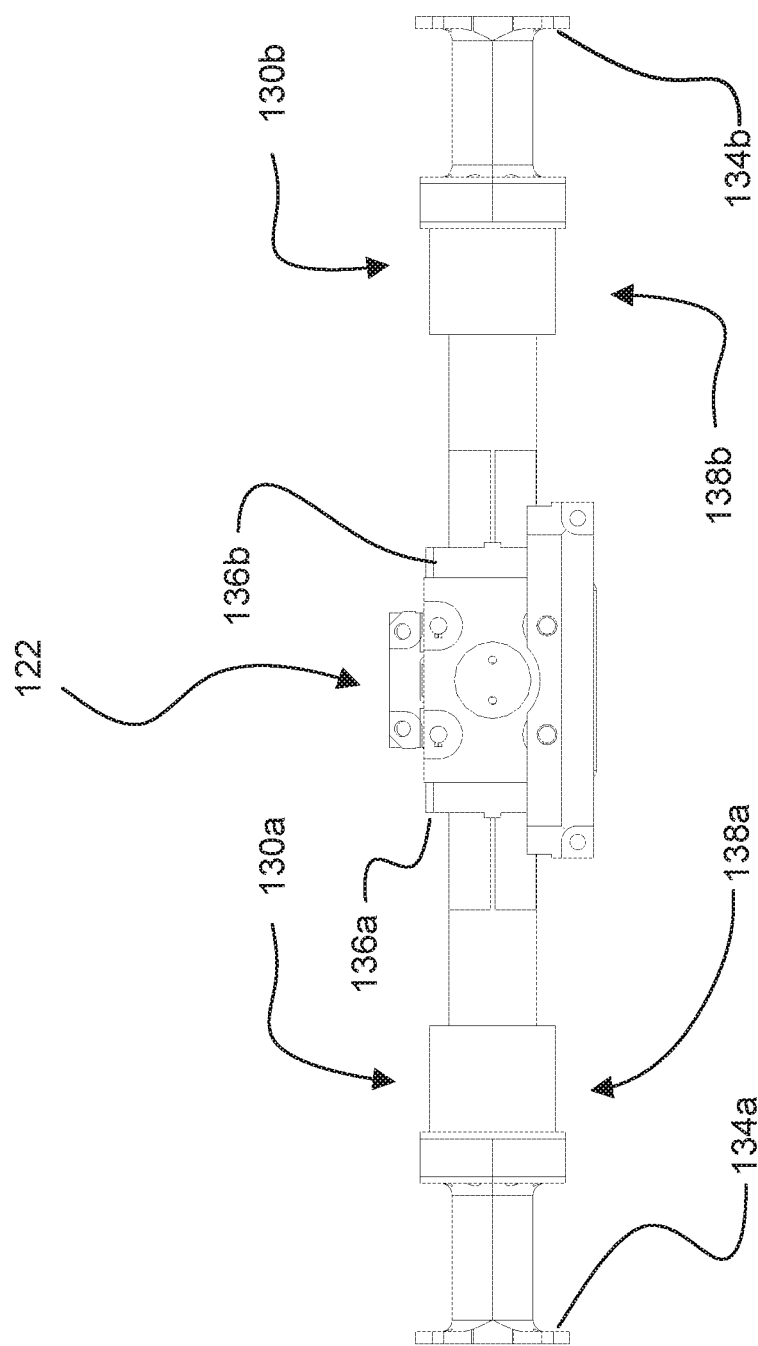
FIG. 12 illustrates a top view of the crossbar system of FIG. 11 with the support structure not shown.
Figure 13:
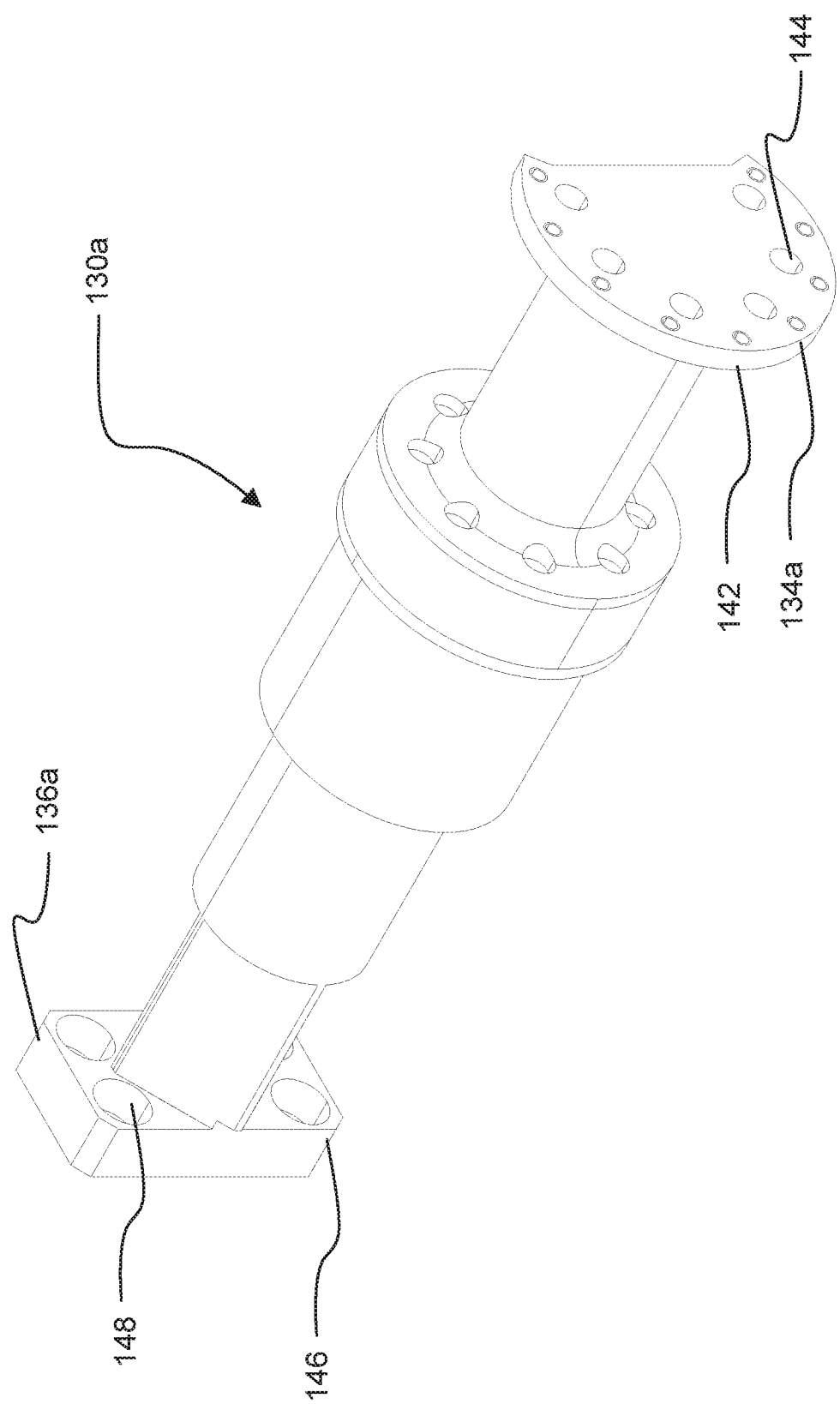
FIG. 13 illustrates an isometric view of a crossbar assembly of the crossbar system shown in FIGS. 11 and 12.
Figure 14:
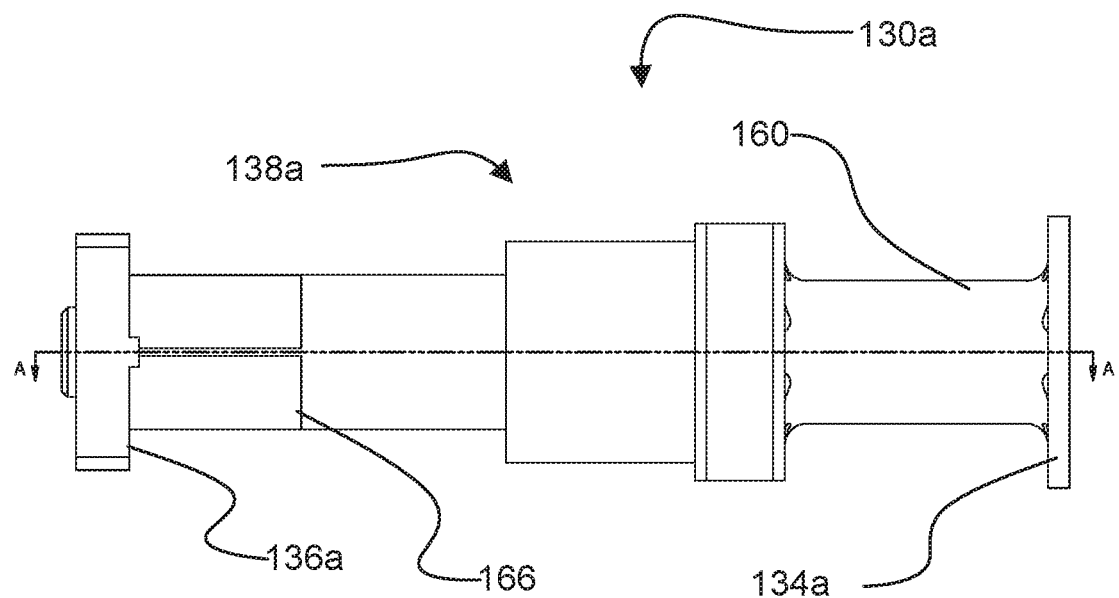
FIG. 14 illustrates a front view of the crossbar assembly shown in FIGS. 11 and 13.
Figure 15:
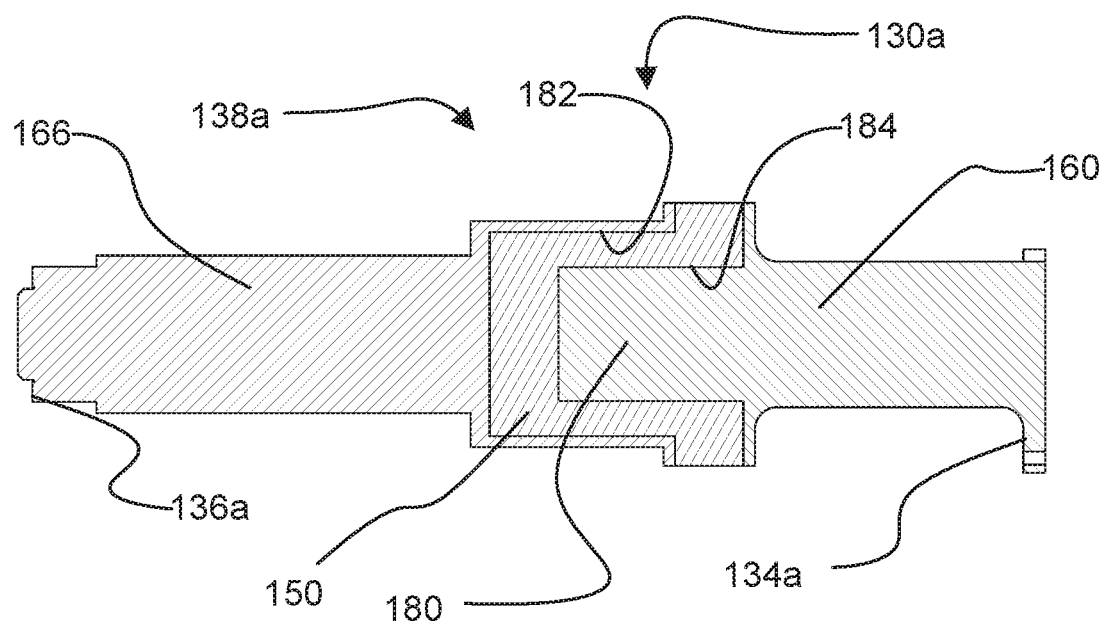
FIG. 15 illustrates a cross-sectional view of the crossbar assembly of the crossbar system shown in FIGS. 11 and 13 taken about line AA of FIG. 14.
Figure 16:
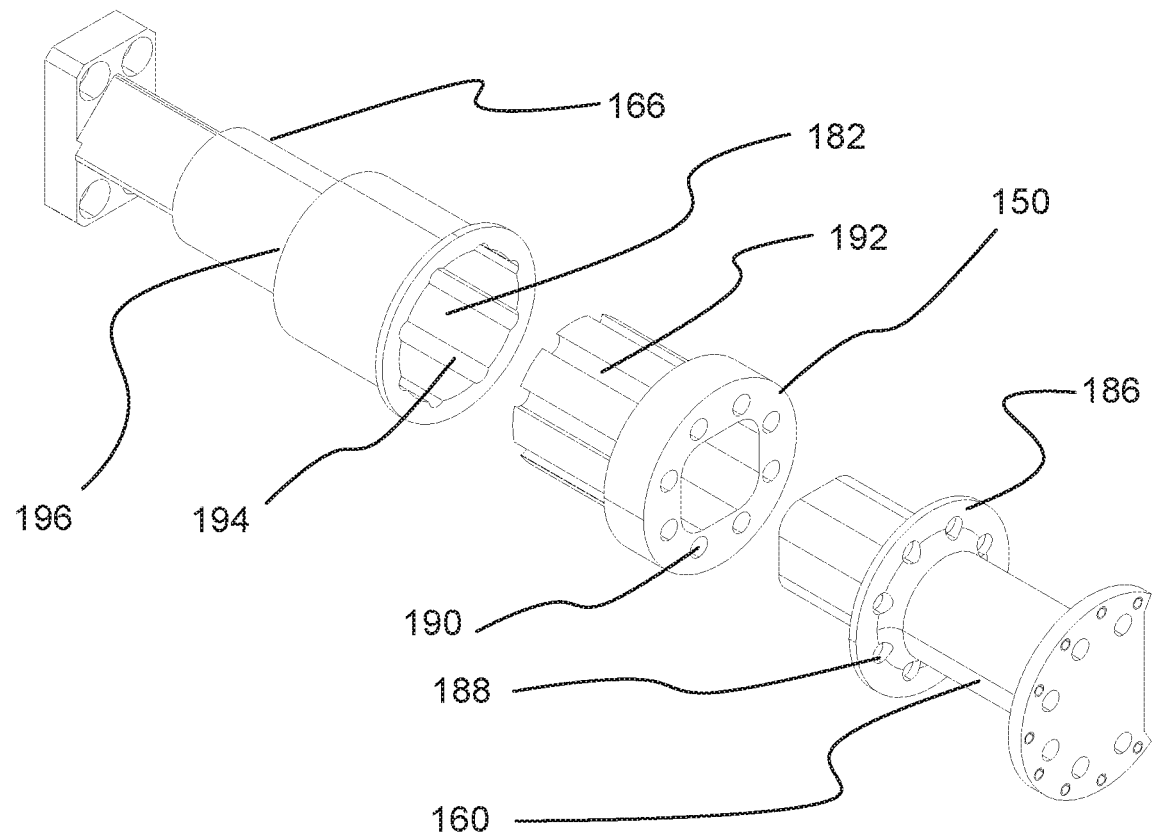
FIG. 16 illustrates an exploded view of the crossbar assembly shown in FIG. 13.

With reference to FIG. 10, and continued reference to FIGS. 1 and 9, illustrated is a detailed cross section of the isolator 38*a* and an end of the inner crossbar segment 66. In some applications, the payload system mount 10 can operate in environments where the temperature fluctuates. If temperature fluctuations are significant enough, the change in temperature can affect the performance of the crossbar system 26. In particular, due to its properties, the stiffness of the elastomeric body 50 can vary with temperature, such as temperatures colder than within an intended operating range of temperatures. As such, in some examples, a heating element 72 can be provided to heat the elastomeric body 50 to reduce the variability of the stiffness of the elastomeric body 50 caused by low temperatures, or in other words, to maintain a certain stiffness parameter (or a range of stiffness parameters). In the example of FIG. 10, the bolt 70 can be configured to comprise a socket sized and shaped to receive a heating element 72. The heating element 72 can be secured in the socket using a conventional fastener, such as a threaded fastener 74 secured to the bolt 70 through the socket. The amount of heating provided by the heating element 72 can be dependent on the amount of power delivered to the heating element 72. In some examples, the power delivered to the heating element 72 can be controlled based on a reference temperature. In some examples, no power is delivered to the heating element 72 by default, but when a reference temperature drops below a threshold temperature, a controller 73, having or coupled to a power source, can deliver power to the heating element 72 via one or more wires 75 electrically coupling the heating element 72 to the controller 73. In some examples, the controller 73 can deliver a variable amount of power to the heating element 72 depending on a reference temperature measured by a sensor operable with the isolator 38*a*, For example, the controller 73 can increase power to the heating element 72 as the reference temperature drops further below the threshold temperature. Without limitation, the reference temperature can be a measured or sensed temperature, such as, but not limited to, an ambient temperature, a vehicle temperature, or a temperature of a component of a sensor system incorporated into the payload system mount 10 and operable with the isolator 38*a*, such as a temperature within the shell 18 of FIG. 1, or a temperature of the elastomeric body 50.

FIGS. 11-16 illustrate another example of a crossbar system 126 operable within the payload system mount 10 discussed above, and shown in FIGS. 1-3, having a support structure with the first and second portions 28*a*, 28*b*. The support structure and the first and second portions 128*a*, 128*b* can be a component of the coarse elevation platform 16 of FIG. 3, as discussed above. The crossbar system 126 can couple to the support structure, including the first and second portions 128*a*, 128*b* in a similar manner as discussed above.

The crossbar system 126 is similar in many respects to the crossbar system 26 discussed above, as will be apparent to those skilled in the art. As such, the above discussion is incorporated here, where applicable, to provide an understanding and discussion of like features and functions. In this example, the crossbar system 126 comprises a first crossbar assembly 130*a*, a second crossbar assembly 130*b*, and a payload mount 122 (e.g., a cardan joint). The payload mount 122 can be the same payload mount described previously with reference to FIGS. 1-5. The first crossbar assembly 130*a* comprises a first structure interface 134*a*, a first payload mount interface 136*a*, and a first isolator 138*a* supported between the first structure interface 134*a* and the first payload mount interface 136*a*, The second crossbar assembly 130*b* comprises a second structure interface 134*b*, a second payload mount interface 136*b*, and a second isolator 138*b* supported between the second structure interface 134*b* and the second payload mount interface 136*b*. The payload mount 122 can be coupled to the first sensor mount interface 136*a* and the second sensor mount interface 136*b*.

In some examples the first crossbar assembly 130*a* and the second crossbar assembly 130*b* can be matching pairs having the same configuration. For convenience of discussion, the first crossbar assembly 130*a* of the crossbar system 126 will be described, with the understanding that the second crossbar assembly 130*b* can have the same configuration. The structure interface 134*a* is operable to mount to the support structure, such as to the first and second portions 128*a*, 128*b* of the support structure. The structure interface 134*a* can comprise a flange 142 having features, such as holes 144 or threaded holes, that align with corresponding features of the support structure. The features of the structure interface 134*a* and the support structure can then be used to secure the crossbar assembly 130 to the support structure. For example, the structure interface 134 can be secured to the support structure by threading threaded fasteners (not depicted) through the holes 144 and into respective threaded apertures or sockets of the support structure.

The payload mount interface 136a is operable to couple to a payload mount, such as the payload mount 122. The payload mount interface 136a can comprise a flange 146 having features, such as holes 148 or threaded holes, that align with corresponding features of the payload mount 122. The features can then be used to mount the first crossbar assembly 130a to the payload mount 122. For example, the payload mount interface 136a can be mounted to the payload mount 122 by threading threaded fasteners (not depicted) through the holes 48 of the flange 146 and into respective threaded apertures or sockets of the payload mount 122.

The isolator 138a comprises an elastomeric body 150. The elastomeric body 150 partially decouples the structure interface 134a from the payload mount interface 136a and dampens vibrations propagating through the first crossbar assembly 130a. The elastomeric body 150 can be comprised of a material having a lower stiffness than material comprising the remaining component of the crossbar assembly 130, as discussed above. The lower stiffness of the elastomeric body 150 results in the first crossbar assembly 130a having a lower resonant frequency compared to a uniform crossbar of a higher stiffness material. The lower resonant frequency can result in a reduction of vibrations transmitted through the first crossbar assembly 130a, as discussed above.

The first crossbar assembly 130a can comprise an outer crossbar segment 160 and an inner crossbar segment 166. The outer crossbar segment 160 can comprise an outer isolator interface in the form of a shaft 180 extending from the structure interface 134a, and the inner crossbar segment 166 can comprise an inner isolator interface in the form of a socket 182 formed in an end opposite the sensor mount interface 136a. The elastomeric body 150 can have a socket 184 sized and shaped to receive the shaft 180 of the outer crossbar segment 160. For example, the socket 184 of the elastomeric body 150 can have an internal size and configuration that is substantially the same as an external size and configuration of the shaft 180 and a depth that is substantially the same as a length of the shaft 180, such that the elastomeric body 150 and the shaft 180 of the outer crossbar segment 160 can be mated together. The socket 182 of the inner crossbar segment 166 can be sized and shaped to receive at least a portion of the elastomeric body 150. For example, the elastomeric body 150 can have an outside size and configuration that is substantially the same as an inner size and configuration of the socket 182, such that the elastomeric body 150 and the inner crossbar segment 166 can be mated together. Thus, the shaft 180 of the outer crossbar segment 160 can be inserted into the socket 184 of the elastomeric body 150 and the elastomeric body 150 can be inserted into the socket 182 of the inner crossbar segment 166.

The outer crossbar segment 160 can have a flange 186 with a plurality of holes 188. The elastomeric body 150 can have a corresponding plurality of holes 190 formed along a flange portion of the elastomeric body 150 and that extend through the flange portion of the elastomeric body 150. As shown, the holes 190 can align with recesses 192 formed in the outer surface of a reduced diameter portion of the elastomeric body 150. The inner crossbar segment 166 can have corresponding recesses 194 formed in the socket 182, such that when the elastomeric body 150 is placed in the socket 182, the recesses 192 of the outer surface of the elastomeric body 150 and the recesses 194 of the socket 182 form bores. The inner crossbar 166 has a plurality of holes (not shown) that correspond to the plurality of recesses 192 allowing a fastener to be inserted at the flange 186 of the outer crossbar segment 160 and extend to a shoulder 196 of the inner crossbar segment 166. The fastener can be threaded and the holes 190 of either the inner crossbar segment 166 or the flange 186, or both, can have a matching thread for receiving the threaded fastener. Thus, the outer crossbar segment 160 can be joined to the inner crossbar segment 166 by passing fasteners through the holes 188 of the flange 186, through the holes 190 of the elastomeric body 150, and threading the fastener into the threaded holes of the shoulder 196.

As shown, the inner crossbar segment 166 is separated a distance from the outer crossbar segment 160, with the flange portion of the elastomeric crossbar 150 situated between them. In this arrangement, the fasteners indirectly couple the inner crossbar segment 166 to the outer crossbar segment 160 while the elastomeric body 150 partially decouples the outer crossbar segment 160 from the inner crossbar segment 166. Because the flange 186 and the shoulder 196 sleeve are separated by the elastomeric body 150, and the bolts can slide within the recesses 192, 194, the elastomeric body 150 is operable to deform allowing relative movement in multiple degrees of freedom between the outer crossbar segment 160 and the inner crossbar segment 166. The deformation of the elastomeric body 150 results in partially decoupling the outer crossbar segment 160 from the inner crossbar segment 166 and dampens vibrations that propagate between the outer crossbar segment 160 and the inner crossbar segments.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A crossbar system facilitating isolation of a sensor assembly from external vibrations of a structure, the crossbar system comprising:
 a first crossbar assembly comprising a first structure interface operable to mount to a structure, a first payload mount interface operable to couple to a payload mount, and a first isolator between the first structure interface and the first payload mount interface, the first isolator comprising a first elastomeric body operable to partially decouple the first structure interface and the first payload mount interface and dampen vibrations propagating through the first crossbar assembly;

a second crossbar assembly comprising a second structure interface operable to mount to the structure, a second payload mount interface operable to couple to the payload mount, and a second isolator between the second structure interface and the second payload mount interface, the second isolator comprising a second elastomeric body operable to partially decouple the second structure interface and the second payload mount interface and dampen vibrations propagating through the second crossbar assembly; and a payload mount coupled to the first payload mount interface and the second payload mount interface, the payload mount operable to mount a sensor assembly;

wherein the first isolator comprises a first heater thermally coupled to the first elastomeric body.

2. The crossbar system of claim 1, wherein the first crossbar assembly further comprises a first outer crossbar segment coupled to the first structure interface and the first isolator, and a first inner crossbar segment coupled to the first payload mount interface and the first isolator, and wherein the second crossbar assembly further comprises a second outer crossbar segment coupled to the second structure interface and the second isolator, and a second inner crossbar segment coupled to the second payload mount interface and the second isolator.

3. The crossbar system of claim 1, wherein the second isolator comprises a second heater thermally coupled to the second elastomeric body.

4. The crossbar system of claim 2, wherein the first isolator further comprises a flange having an aperture sized and configured to receive the first elastomeric body, a sleeve secured within the first elastomeric body, and a fastener coupling the sleeve to the first inner crossbar segment.

5. The crossbar system of claim 4, wherein the first heater is located within the fastener.

6. The crossbar system of claim 2, wherein the first inner crossbar segment comprises a socket and the first outer crossbar segment comprises a shaft, wherein the first elastomeric body is located at least partially about the shaft and at least partially within the socket.

7. The crossbar system of claim 6, wherein the shaft is located at least partially within the socket.

8. The crossbar system of claim 6, further comprising at least one fastener extending from the first outer crossbar segment to the first inner crossbar segment, the at least one fastener coupling the first outer crossbar segment to the first inner crossbar segment.

9. A crossbar assembly for facilitating isolation of a sensor assembly from external vibration of a payload system mount on a vehicle, the crossbar assembly comprising:

an outer crossbar segment comprising a payload mount interface operable to mount to a payload mount, and an outer isolator interface operable to mount to an isolator;

an inner crossbar segment moveable relative to the outer crossbar segment in multiple degrees of freedom, the inner crossbar segment comprising a structure interface operable to mount to a structure, and an inner isolator interface operable to mount to the isolator; and the isolator supported by the outer and inner crossbar segments, the isolator comprising an elastomeric component operable to elastically deform in response to relative movement between the outer and inner crossbar segments, and a heater thermally coupled to the elastomeric component;

wherein the isolator operates to partially decouple the outer crossbar segment from the inner crossbar segment and dampen vibrations propagating between the outer and inner crossbar segments.

10. The crossbar assembly of claim 9, wherein the isolator comprises a rigid flange coupled to an outer surface of the elastomeric component and a sleeve coupled to an inner surface of the elastomeric component.

11. The crossbar assembly of claim 10, wherein the rigid flange is coupled to outer isolator interface and the sleeve is coupled to the inner isolator interface.

12. The crossbar assembly of claim 11, further comprising a bolt coupling the sleeve to the inner isolator interface, wherein the heater is located within the bolt.

13. The crossbar assembly of claim 9, wherein the inner isolator interface comprises a socket and the outer isolator interface comprises a shaft, wherein the elastomeric component is located at least partially about the shaft and at least partially within the socket.

14. The crossbar assembly of claim 13, wherein the shaft is located at least partially within the socket.

15. The crossbar assembly of claim 13, further comprising at least one fastener extending from the outer isolator interface to the inner isolator interface and coupling the inner isolator interface to the outer isolator interface.

16. A payload system mount comprising:

a base structure;

a support structure rotatably coupled to the base structure;

a crossbar system supported by the support structure, the crossbar system comprising:

a first crossbar assembly comprising a first structure interface coupled to the support structure, a first payload mount interface operable to couple to a payload mount, and a first isolator between the first structure interface and the first payload mount interface, the first isolator comprising a first elastomeric body operable to partially decouple the first structure interface and the first payload mount interface and dampen vibrations propagating through the first crossbar assembly;

a second crossbar assembly comprising a second structure interface coupled to the support structure, a second payload mount interface operable to couple to the payload mount, and a second isolator between the second structure interface and the second payload mount interface, the second isolator comprising a second elastomeric body operable to partially decouple the second structure interface and the first payload mount interface and dampen vibrations propagating through the second crossbar assembly;

a payload mount coupled to the first payload mount interface and the second payload mount interface; and a sensor assembly coupled to the payload mount, the sensor assembly comprising at least one sensor;

wherein the first isolator comprises a first heater thermally coupled to the first elastomeric body.

17. The payload system mount of claim 16, wherein the first crossbar assembly further comprises a first outer crossbar segment coupled to the first structure interface and the first isolator, and a first inner crossbar segment coupled to the first payload mount interface and the first isolator, and wherein the second crossbar assembly further comprises a second outer crossbar segment coupled to the second structure interface and the second isolator, and a second inner crossbar segment coupled to the second payload mount interface and the second isolator.

18. The payload system mount of claim 16, wherein the second isolator comprises a second heater thermally coupled to the second elastomeric body.

19. The payload system mount of claim 17, wherein the first isolator further comprises a flange having an inner aperture sized and configured to receive the first elastomeric body, a sleeve secured within the first elastomeric body, and a fastener coupling the sleeve to the first inner crossbar segment.

20. The payload system mount of claim 17, wherein the first inner crossbar segment comprises a socket and the first outer crossbar segment comprises a shaft, wherein first the elastomeric body is located at least partially about the shaft and at least partially within the socket.

21. A crossbar system facilitating isolation of a sensor assembly from external vibrations of a structure, the crossbar system comprising:
   a first crossbar assembly comprising a first structure interface operable to mount to a structure, a first payload mount interface operable to couple to a payload mount, a first isolator between the first structure interface and the first payload mount interface, a first outer crossbar segment coupled to the first structure interface and the first isolator, and a first inner crossbar segment coupled to the first payload mount interface and the first isolator, wherein the first isolator comprises a first elastomeric body operable to partially decouple the first structure interface and the first payload mount interface and dampen vibrations propagating through the first crossbar assembly, a flange having an aperture sized and configured to receive the first elastomeric body, a sleeve secured within the first elastomeric body, and a fastener coupling the sleeve to the first inner crossbar segment;
   a second crossbar assembly comprising a second structure interface operable to mount to the structure, a second payload mount interface operable to couple to the payload mount, and a second isolator between the second structure interface and the second payload mount interface, the second isolator comprising a second elastomeric body operable to partially decouple the second structure interface and the second payload mount interface and dampen vibrations propagating through the second crossbar assembly;
   a payload mount coupled to the first payload mount interface and the second payload mount interface, the payload mount operable to mount a sensor assembly; and
   a heater located within the fastener.

22. A crossbar system facilitating isolation of a sensor assembly from external vibrations of a structure, the crossbar system comprising:
   a first crossbar assembly comprising a first structure interface operable to mount to a structure, a first payload mount interface operable to couple to a payload mount, a first isolator between the first structure interface and the first payload mount interface, a first outer crossbar segment coupled to the first structure interface and the first isolator, and a first inner crossbar segment coupled to the first payload mount interface and the first isolator, the first isolator comprising a first elastomeric body operable to partially decouple the first structure interface and the first payload mount interface and dampen vibrations propagating through the first crossbar assembly;
   a second crossbar assembly comprising a second structure interface operable to mount to the structure, a second payload mount interface operable to couple to the payload mount, and a second isolator between the second structure interface and the second payload mount interface, the second isolator comprising a second elastomeric body operable to partially decouple the second structure interface and the second payload mount interface and dampen vibrations propagating through the second crossbar assembly; and
   a payload mount coupled to the first payload mount interface and the second payload mount interface, the payload mount operable to mount a sensor assembly;
   wherein the first inner crossbar segment comprises a socket and the first outer crossbar segment comprises a shaft, wherein the first elastomeric body is located at least partially about the shaft and at least partially within the socket.

23. A crossbar assembly for facilitating isolation of a sensor assembly from external vibration of a payload system mount on a vehicle, the crossbar assembly comprising:
   an outer crossbar segment comprising a payload mount interface operable to mount to a payload mount, and an outer isolator interface operable to mount to an isolator;
   an inner crossbar segment moveable relative to the outer crossbar segment in multiple degrees of freedom, the inner crossbar segment comprising a structure interface operable to mount to a structure, and an inner isolator interface operable to mount to the isolator; and
   the isolator supported by the outer and inner crossbar segments, the isolator comprising an elastomeric component operable to elastically deform in response to relative movement between the outer and inner crossbar segments, a rigid flange coupled to an outer surface of the elastomeric component, and a sleeve coupled to an inner surface of the elastomeric component; and
   wherein the isolator operates to partially decouple the outer crossbar segment from the inner crossbar segment and dampen vibrations propagating between the outer and inner crossbar segments;
   wherein the rigid flange is coupled to the outer isolator interface and the sleeve is coupled to the inner isolator interface.

24. A crossbar assembly for facilitating isolation of a sensor assembly from external vibration of a payload system mount on a vehicle, the crossbar assembly comprising:
   an outer crossbar segment comprising a payload mount interface operable to mount to a payload mount, and an outer isolator interface operable to mount to an isolator, the outer isolator interface comprising a shaft;
   an inner crossbar segment moveable relative to the outer crossbar segment in multiple degrees of freedom, the inner crossbar segment comprising a structure interface operable to mount to a structure, and an inner isolator interface operable to mount to the isolator, the inner isolator interface comprising a socket;
   the isolator supported by the outer and inner crossbar segments, the isolator comprising an elastomeric component operable to elastically deform in response to relative movement between the outer and inner crossbar segments, wherein the elastomeric component is located at least partially about the shaft of the outer isolator interface and at least partially within the socket of the inner isolator interface; and at least one fastener extending from the outer isolator interface to the inner isolator interface and coupling the inner isolator interface to the outer isolator interface;

wherein the isolator operates to partially decouple the outer crossbar segment from the inner crossbar segment and dampen vibrations propagating between the outer and inner crossbar segments.

25. A payload system mount comprising:

a base structure;

a support structure rotatably coupled to the base structure;

a crossbar system supported by the support structure, the crossbar system comprising:

a first crossbar assembly comprising a first structure interface coupled to the support structure, a first payload mount interface operable to couple to a payload mount, and a first isolator between the first structure interface and the first payload mount interface, a first outer crossbar segment coupled to the first structure interface and the first isolator, and a first inner crossbar segment coupled to the first payload mount interface and the first isolator, wherein the first isolator comprises a first elastomeric body operable to partially decouple the first structure interface and the first payload mount interface and dampen vibrations propagating through the first crossbar assembly;

a second crossbar assembly comprising a second structure interface coupled to the support structure, a second payload mount interface operable to couple to the payload mount, and a second isolator between the second structure interface and the second payload mount interface, the second isolator comprising a second elastomeric body operable to partially decouple the second structure interface and the first payload mount interface and dampen vibrations propagating through the second crossbar assembly;

a payload mount coupled to the first payload mount interface and the second payload mount interface; and a sensor assembly coupled to the payload mount, the sensor assembly comprising at least one sensor wherein the first inner crossbar segment comprises a socket and the first outer crossbar segment comprises a shaft, wherein the first elastomeric body is located at least partially about the shaft and at least partially within the socket.

\* \* \* \* \*